US007783630B1

(12) United States Patent
Chevalier et al.

(10) Patent No.: US 7,783,630 B1
(45) Date of Patent: *Aug. 24, 2010

(54) TUNING OF RELEVANCY RANKING FOR FEDERATED SEARCH

(75) Inventors: Pierre-Yves Chevalier, Biviers (FR); Bruno Roustant, Gières (FR)

(73) Assignee: EMC Corporation, Hopkinton, MA (US)

( * ) Notice: Subject to any disclaimer, the term of this patent is extended or adjusted under 35 U.S.C. 154(b) by 354 days.

This patent is subject to a terminal disclaimer.

(21) Appl. No.: 11/824,304

(22) Filed: Jun. 29, 2007

(51) Int. Cl.
    *G06F 17/30* (2006.01)
(52) U.S. Cl. .................. 707/723; 707/727; 707/728; 707/730; 707/731; 707/748; 707/749; 707/750
(58) Field of Classification Search ............... 707/3, 707/4, 5, 6, 7, 104.1, 723, 727, 728, 730, 707/731, 748, 749, 750
    See application file for complete search history.

(56) References Cited

U.S. PATENT DOCUMENTS

| | | | | |
|---|---|---|---|---|
| 6,009,422 A * | 12/1999 | Ciccarelli | ................. | 1/1 |
| 6,434,550 B1 * | 8/2002 | Warner et al. | ................. | 1/1 |
| 6,434,556 B1 * | 8/2002 | Levin et al. | ................. | 1/1 |
| 6,842,761 B2 * | 1/2005 | Diamond et al. | ................. | 1/1 |
| 7,130,849 B2 * | 10/2006 | Yayoi et al. | ................. | 707/5 |
| 7,188,106 B2 * | 3/2007 | Dwork et al. | ................. | 707/5 |
| 7,194,458 B1 * | 3/2007 | Micaelian et al. | ................. | 1/1 |
| 7,243,093 B2 * | 7/2007 | Cragun et al. | ................. | 707/3 |
| 7,281,002 B2 * | 10/2007 | Farrell | ................. | 1/1 |
| 7,447,678 B2 * | 11/2008 | Taylor et al. | ................. | 1/1 |
| 7,565,630 B1 * | 7/2009 | Kamvar et al. | ................. | 1/1 |
| 2006/0042483 A1 * | 3/2006 | Work et al. | ................. | 101/91 |
| 2006/0047651 A1 * | 3/2006 | Milic-Frayling et al. | ....... | 707/5 |
| 2006/0059138 A1 * | 3/2006 | Milic-Frayling et al. | ....... | 707/3 |
| 2006/0161534 A1 * | 7/2006 | Carson et al. | ................. | 707/3 |
| 2006/0230040 A1 * | 10/2006 | Curtis et al. | ................. | 707/7 |
| 2006/0277098 A1 * | 12/2006 | Chung et al. | ................. | 705/14 |
| 2007/0208730 A1 * | 9/2007 | Agichtein et al. | ................. | 707/5 |
| 2007/0219988 A1 * | 9/2007 | Mueller et al. | ................. | 707/5 |
| 2007/0266025 A1 * | 11/2007 | Wagner et al. | ................. | 707/7 |
| 2007/0271146 A1 * | 11/2007 | Nordmark et al. | ............. | 705/26 |
| 2007/0276807 A1 * | 11/2007 | Chen et al. | ................. | 707/3 |
| 2009/0006360 A1 * | 1/2009 | Liao et al. | ................. | 707/5 |

OTHER PUBLICATIONS

Carol L. Barry & Linda Schamber, *User's Criteria for Relevance Evaluation: A Cross-Situational Comparison*, Information Processing & Management, 1998, pp. 219-236, vol. 34, No. 2/3, School of Library and Information Science, Louisiana State university, Baton Rouge, LA.

Sergey Brin & Lawrence Page, *The Anatomy of a Large-Scale Hypertextual Web Search Engine*, Computer Networks and ISDN Systems 30, 1998, pp. 107-117, Stanford, CA.

* cited by examiner

*Primary Examiner*—Don Wong
*Assistant Examiner*—Thanh-Ha Dang
(74) *Attorney, Agent, or Firm*—Van Pelt, Yi & James LLP

(57) ABSTRACT

Determining a relevancy ranking score is disclosed. An indication is received that a relevancy ranking score algorithm is to be tuned to a selected preference. The relevancy ranking score algorithm is updated based at least in part on the selected preference, wherein the relevancy ranking score of a search result resulting from a search query is based at least in part on one or more constraints of the search query.

20 Claims, 5 Drawing Sheets

TUNING OF RELEVANCY RANKING FOR FEDERATED SEARCH

BACKGROUND OF THE INVENTION

Searching multiple sources (e.g., web sites, repositories, databases, etc.) returns a variety of search results. These search results need to be sorted or ranked when presenting them to the user. Ideally, the results are sorted or ranked in terms of what the searcher most desires to see as a result of the search the searcher initiated. One common method of sorting and ranking web search results involves pre-indexing the web sites to indicate factors such as links, frequency of terms of interest, etc. Search result rankings are determined based on comparing the pre-indexed results between the search results. However, pre-indexing all of the content a processing and storage intensive effort. In addition, comparing of pre-indexed results provides no flexibility to account for a searcher's preferences. For example, when performing a search for medical information a computer programmer searcher may have a preference for lay medical information sources and a medical researcher searcher may have a preference for a medical library or journal repository sources. It would be better if search results could be sorted or ranked without comparing pre-indexed results and include preferences based on a searcher's.

BRIEF DESCRIPTION OF THE DRAWINGS

Various embodiments of the invention are disclosed in the following detailed description and the accompanying drawings.

DETAILED DESCRIPTION

Figure 1:
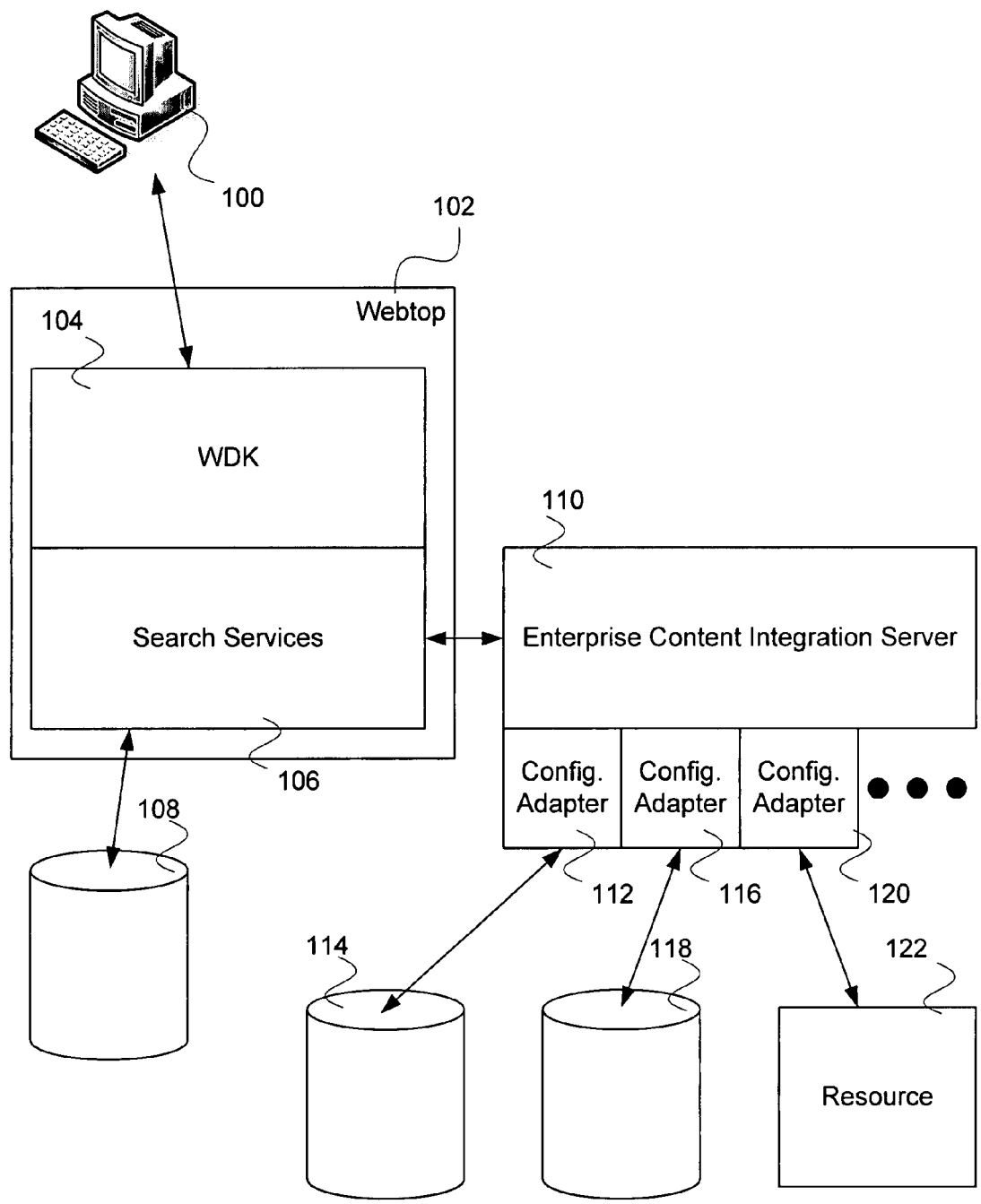
FIG. 1 is a block diagram illustrating an embodiment of a system for relevancy scoring.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Tuning relevancy scoring is disclosed. A query is received that includes a constraint. A ranking score for a search result includes a consideration of whether a constraint of the search was met or not met by the search result. A constraint expresses allowed desired values for a match in the search result. In various embodiments, a constraint includes a term or a term and an operator. Metadata or attribute information is also used in some embodiments in determining a ranking score. The ranking score is designed to mimic a user's assessment of relevancy of a search result and includes in various embodiments one or more of a number of perceived relevance features. Examples of relevancy features include scope/depth, accuracy/validity, currency, quality of source, and clarity. The various feature scores are combined to create a relevancy score. The feature scores and/or the combining of feature scores can be tuned for or by a user, a system, a super user, an administrator, an individual search, or for any other appropriate searcher or search. In various embodiments, scores are tuned using constants or functions that are added to or multiplied with elements in the scoring functions. In some embodiments, a user, a super user, an administrator, a search criteria, or any other appropriate configuration or criteria setting method sets a tunable element indirectly whereby the user, super user, administrator, search criteria tune or set an intuitively understandable criteria for search (e.g., computer code search, contract search, math article search, etc.) which in turn adjust multiple weights or added factors of features/elements in the relevancy score. For example, a contract search adds a greater weight to a document-type attribute of contract, a format-type attribute of PDF, and a department-type attribute of legal; the contract search can also tune clarity to lower the score of documents with computer code, mathematical symbols, or other non-English text type content.

In some embodiments, tuning includes a conditional favoring of search results with attribute B='Y' if attribute A='X'. For example, an administrator sets that if content-type is 'contract,' then relevancy score is higher for documents are format-type 'PDF'. In some embodiments, the conditional tuning includes if attribute A='X', then relevancy score uses a added or multiplied constant (e.g., +Z or *Z) or function (e.g., +f (input_parameter) or *f (input_parameter) instead of constant or other function).

A relevancy scoring of a result that is returned from searching heterogeneous sources (e.g., repositories, web resource, databases, etc.) is computed based on a set of independent features. These features simulate evaluation criteria of an end user. The features include use of query structure and data structure. The features are combined into a single score using a weight based formula. This enables the features to be tuned as well depending on a user, super user, administrator, or search criteria for searching. In various embodiments, the tuning includes adding or multiplying a constant or a function to one or more of the factors included in the relevancy score calculation. In some embodiments, the tuning is achieved by a user, super user, administrator or search criteria that indirectly sets weights or adds or multiplies constants or factors in a relevancy score calculation. For example, a code searching tuning, a medical article tuning, a contract tuning, etc. may have different constants or functions adding or multiplying the different features that are added/multiplied together for calculating a relevancy score. In some embodiments, the rank is received as a metadata associated with a search result from a search source. In some embodiments, the feature includes a constraint which includes an operator such as CONTAINS, DOES_NOT_CONTAIN, BEGINS_WITH, ENDS_WITH, ALWAYS_WITHIN, AND, OR, NOT, EQUALS, GREATER_THAN, LESS_THAN, GREATER_THAN_OR_EQUAL_TO, LESS_THAN_OR_EQUAL_TO, or any other appropriate operator.

In various embodiments, a feature includes scope/depth, accuracy/validity, clarity, currency, quality of source, or any other appropriate feature useful in calculating a relevancy score.

In some embodiments, a score for each result can be computed on the fly. That is, a whole set of results does not have to be received to be able to compute the score by comparing them to each other. Each result gets its own score computable based on its own content and/or metadata. After this, there is a sorting by score (and maybe resorting as additional results are received, e.g., from additional sources). In some embodiments, there is a merging based on the score results or rank results from two scoring or ranking systems.

In some embodiments, computing a score for each result on the fly as that result is received is disclosed, based on the result itself and not a relative comparison of results, and applying to metadata the criteria applied previously only to the structured content itself. In some embodiments, the metadata or attributes of the search result are synthesized (e.g., a title, a date, an abstract, a body, etc.) from the search result.

FIG. 1 is a block diagram illustrating an embodiment of a system for relevancy scoring. In the example shown, one or more users connect to web-based content management application 102 using a computer system, represented in FIG. 1 by computer 100. In the example shown, web-based content management application 102 is built on a content management system vendor-provided web development kit (WDK) 104. In some embodiments, WDK 104 comprises a set of tools to facilitate development of web-based applications, e.g., by providing reusable components pre-configured to interact with a content server and/or other repository to provide content management services. Web-based content management application 102 in some embodiments provides to users content type aware content management services and/or functions. An example of a content type aware service or function is providing a view (display) based at least in part on content item type, e.g., displaying a "calendar" as a grid and an email message with "to", "from", "subject", and/or other fields in a header display region at the top of the display, attachment names/icons in an attachment display region below the header, and message text in a message body display region at the bottom; enabling a user to search by content type; and displaying query results in a manner determined based at least in part on content type. In various embodiments, content types comprise one or more of the following: contracts, news, code, financial, spread sheet, portable document format (PDF), HTML, XML, graphics, multimedia, or any other appropriate content type.

Web-based content management application 102 also includes search services 106. In some embodiments, a user requests a search to a content management system. The content management service searches both the internal repositories of the content management system and external repositories and other attached resources. The content management system receives the search request and the WDK 104 translates the search request for search services 106. Search services 106 translates the search request for a direct search of internal content management system repository 108 and an indirect search of external repositories/resources via enterprise content integration server 110. In some embodiments, search services 106 are provided by business logic and/or foundation classes that comprise a content management framework on which web-based content management application 102 and WDK 104 are based.

Search services 106 computes a score that is used to merge and rank results from different sources including external repositories/resources and internal sources/repositories for display to the user. The score is computed based on a probability of interest of the user performing a search. The score is based on the match of a result to the query terms and the precision of the query.

Enterprise content integration (ECI) server 110 targets the search request for a search of one or more external repositories, represented in FIG. 1 by 114 and 118, and/or other resources, represented in FIG. 1 by 122. In various embodiments, external repositories comprise other content management systems, database systems, legacy content management systems not capable of the type of search desired, (e.g., Filenet™, LexisNexis™, Lotus Notes™, etc.). In various embodiments, other resources include information sources or search services—for example, Google™, Yahoo™, MSN™, MySimon™, Pricewatch™, AskJeeves™, etc. The targeted search request is translated and adapted using a configuration adapter, represented in FIG. 1 by configuration adapter 112, 116, and 120. The configuration adapter also translates and adapts the responses to the search request and passes the responses to ECI server 110. In some embodiments, the configuration adapter includes associated information in the response to the search request.

In some embodiments, the associated information is ultimately used as metadata information that enables the content management system to treat the search results as typed information for the results of the search. In some embodiments, type information is synthesized for search results based on information in search result or information about sources of the search results. In some embodiments, a query broker (not shown) at the content management system is configured to communicate with the ECI server 110 and to use information about the external content sources accessed via ECI server 110 to associate type information with results received from ECI server 110. The results from ECI server 110 in some embodiments indicate the external content source for each responsive content item (or group of items), and the query broker at the content management system associates type information with each content item (or set of content items) based on the source, as identified for example by data associated with a configuration file and/or adapter used to retrieve and/or identify the content from the external source. In some embodiments, more than one configuration adapter is associated with a specific repository or resource—for example, one configuration adapter is configured to facilitate searching for contract information in a specific database and another configuration adapter is configured to facilitate searching for financial information or specification information in the same specific database. In some embodiments, a configuration adapter is easily configured by a user, system administrator, system manager using an application with a graphical user interface (e.g., a WYSIWYG editor) to establish general parsing and syntax rules for communication between the ECI server and the external repository or resource. In various embodiments, the configuration adapter configuration is based on preconfigured templates, has a self learning engine in order to self-configure based at least in part on the external repository type and/or external resource type.

Figure 2:
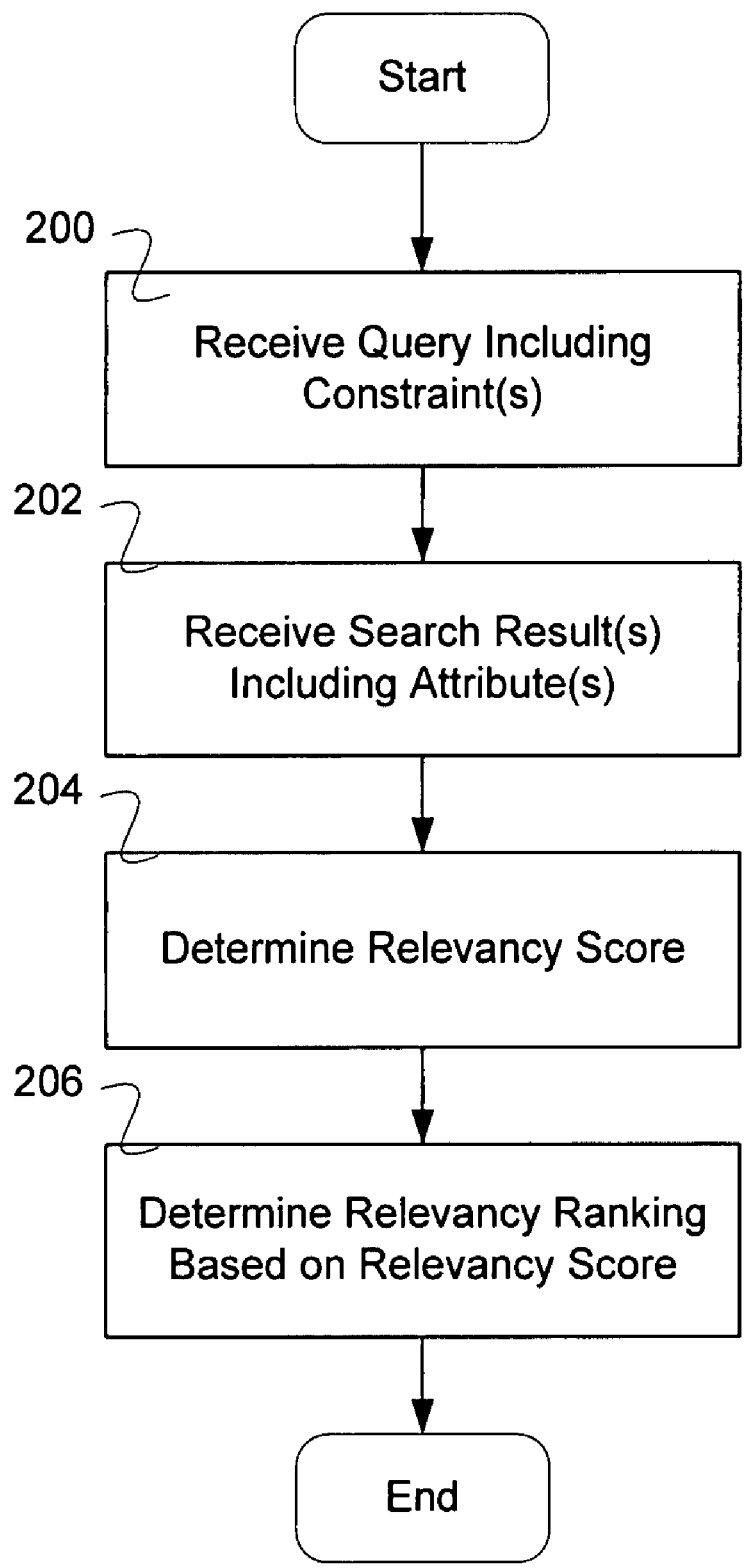
FIG. 2 is a flow diagram illustrating an embodiment of a process for relevancy scoring.

FIG. 2 is a flow diagram illustrating an embodiment of a process for relevancy scoring. In the example shown, in 200 a query is received including constraints. In various embodiments, constraints in a query include constraints using the one or more of the following operators: DOES NOT CONTAIN, CONTAINS, BEGINS WITH, ENDS WITH, AND, OR, EQUALS, GREATER THAN, LESS THAN, DOES NOT EQUAL, or any other appropriate operator. In 202, search results(s) are received including attribute(s). An attribute comprises a metadata attached to a search result; in a typical case, the search result comprises a document. In various embodiments, an attribute comprises a title or document name, a creation or modification date, a summary or abstract for the document, a document type, or any other appropriate attribute. In some embodiments, attributes are called properties and include a title, a category, keywords, etc. In 204, a relevancy score is calculated. The relevancy score evaluates relevancy using a small set of criteria that are similar to what user uses to evaluate relevancy. The criteria include measures of depth/scope, accuracy/validity, clarity, currency, and quality of sources. The criteria are then combined using weights. In 206, a relevancy ranking is calculated based on the relevancy score. Scores are evaluated with respect to each other and other scores, and in some cases merged, to determine a ranking. In some embodiments, scores are weighted or normalized while being evaluated and/or merged for the ranking.

Figure 3:
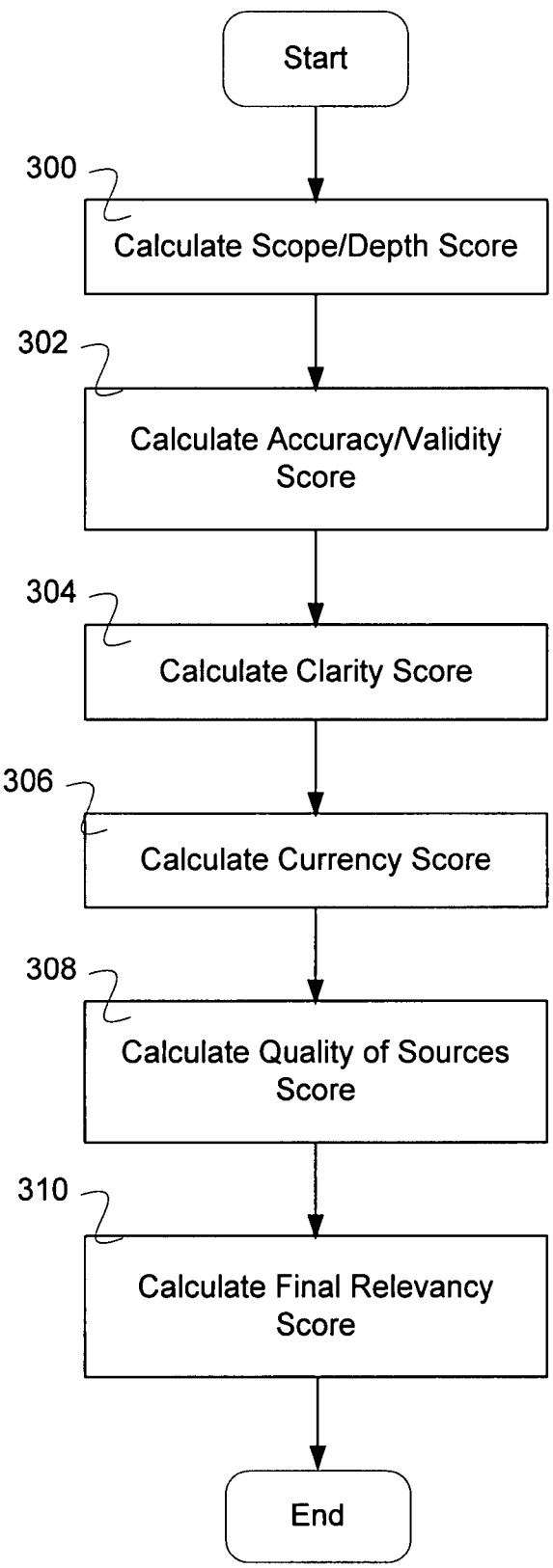
FIG. 3 is a flow diagram illustrating an embodiment of a process for determining relevancy score.

FIG. 3 is a flow diagram illustrating an embodiment of a process for determining relevancy score. In some embodiments, the process of FIG. 3 is used to implement 204 of FIG. 2. In the example shown, in 300 a scope/depth score is calculated. The scope/depth score uses constraints with the operators: CONTAINS, DOES_NOT_CONTAIN, ALWAYS_WITHIN, BEGINS_WITH, and ENDS_WITH. Operators like EQUALS, GREATER_THAN, LESS_THAN, AND, NOT, and OR are measured using the accuracy/validity score. The scope/depth score includes a measure of the number of CONTAINS-like constraints that are satisfied. Attributes with multiple constraints are not penalized in the scope/depth score, and attributes with only one constraint are not weighted too heavily. One goal for the scope/depth score is that a satisfied constraint must always increase the scope/depth score; for example, if in a first case we have only one constraint on the title attribute, and in a second case we have the same constraint plus a second satisfied constraint on title, then the second case must always be assigned a greater score than the first case. Another goal for the scope/depth score is that an unsatisfied constraint must always decrease the score. For example, if in a first case we have only one constraint on the title attribute, and in a second case we have the same constraint plus a second unsatisfied constraint on tile, then the second case must always be assigned a lower score than the first case. In addition, a bonus score is given to a primary attribute (e.g., a name or title of a document) that matches its constraint. If the primary attribute does not match its specific constraint, then try to match its constraint with the result full-text content.

In some embodiments, a scope/depth score uses the following:

If there is no attribute with contains-like constraints, then

Score[scope/depth]=a constant value such as 0.9;

If there are attributes with contains-like constraints, then

Score[scope/depth]=Σ(nbCTtotal[attribute]*Weight[attribute]*Score[attribute])/Σ(nbCTtotal[attribute]*Weight[attribute]);

Where

Σ: sum for all attributes;

nbCTtotal[attribute] is the number of contains-like constraints (satisfied or not) for the attribute (just counting CONTAINS like constraints, ignoring all EQUALS, GREATER_THAN like constraints), counting up to a maximum of constraints (e.g., four constraints);

Weight[attribute] is the weight factor for a specific attribute, a real number value that is greater than or equal to 0; Note that in some embodiments, this value can be set by an user, a super user, and/or administrator; One can define a weight for any specific attribute, this weight is relative to other weights and is designed to represent the importance of the attribute compared to (e.g., in relation to) other attributes. By default all attributes have a neutral weight of 1; For example, it is desired to increase the importance of the 'summary' attribute because it contains relevant data in the system (e.g., more relevant than other attributes' data); So, a weight of 2 is set for it; Each match in this particular attribute will improve the score twice as much as other matches in other attributes; For another example, this weighting can be used to increase the importance of all '*format*' attributes (i.e., attributes whose name contains 'format') or the importance of attributes with the value '*pdf' (e.g., in the event that PDF formatted documents are important compared to other documents that match in other formats) by setting a weight of 4 for them;

Score[attribute]=(nbCTok[attribute]+bonusOcc)/nbCTtotal[attribute]*Fscope(nbCTtotal[attribute]);

If the attribute is primary and has a positive score, then multiply it by the Primary Bonus (e.g., a value such as 1.3);

If the attribute is primary but has a zero score, then recompute its score by comparing its constraint with the result of the full-text content score and multiply the score by the Primary Full-Text Factor (e.g., a value such as 0.3); Note that in some embodiments, this value can be set by an user, a super user, and/or administrator; Normally, the full-text content is the full textual content of the document; But in some cases (e.g., search), the results do not provide a document's full text content (e.g., for performance reasons), they only provide document metadata. In this case, an artificial 'full-text content' attribute can be constructed by aggregating the values of all or some (e.g., excepting particular ones based on a configuration) attributes;

nbCTok[attribute] is the number of satisfied contains-like constraints for a specific attribute, counting up to a maximum of number satisfied constraints (e.g., four constraints);

bonusOcc is added (e.g., a value of 1) if the CONTAINS constraint value occurs multiple times. The score may be greater than 1 in rare cases;

Fscope(x) is a function that takes a number of constraints as parameter and returns a real number value within [0,1]; Fscope(x) increases as x is increased; and Note that score[scope/depth] may be greater than 1 in rare cases.

In some embodiments, the scope/depth score is tuned for a particular user, super user, administrator, type of search, or any other appropriate tuning. For example, a search for patents may set the primary attribute as the abstract whereas a search for doctoral theses may set the primary attribute as the title. In some embodiments, bonus weight or attribute weights are tuned.

In 302, an accuracy/validity score is calculated. The scores for accuracy and validity are merged because it is not a goal for the accuracy/validity score to count a constraint that improves the query precision, where the constraint is unsatisfied. For the accuracy/validity score, some constraint operators are considered more precise than others; For example, EQUALS is more precise than GREATER_THAN (or LESS_THAN_OR_EQUAL_TO, etc.), which is more precise than CONTAINS. Also, for the accuracy/validity score an AND (or NOT) operator improves the query precision with multiple constraints, but an OR operator does not improve much the query precision with multiple constraints. In addition, each satisfied constraint must be taken into account for the accuracy/validity score, not only the overall constraint with logical operators.

In some embodiments, a accuracy/validity score uses the following:

Score[accuracy/validity]=Score[overall constraint];

Where

Score[overall constraint] is computed by visiting the overall constraint tree that mixes all attributes;

Score[single constraint] depends on whether it is satisfied (score=0 if unsatisfied), and if it is satisfied it depends on the type of the constraint: for example, EQUAL=1, GREATER_THAN=0.95, ENDS_WITH=0.9, CONTAINS=0.85, DOESN'T_CONTAIN=0.8; Score[single constraint] always has a value within [0,1];

Score[AND]=Σ(constraint score*constraint weight)/Σ (constraint weight)*$F$acc_and($nb$ constraint total);

Σ is the sum for all ANDed constraints;

Score[OR]=Σ(constraint score*constraint weight)/Σ (constraint weight)*$F$acc_or($nb$ constraint total);

Σ is the sum for all ORed constraints;

Constraint weight is the weight of the constraint attribute; Note that in some embodiments, this value can be set by an user, a super user, and/or administrator; One can define a weight for any specific constraint attribute, this weight is relative to other weights and is designed to represent the importance of the attribute compared to (e.g., in relation to) other attributes. By default all attributes have a neutral weight of 1; For example, it is desired to increase the importance of the 'summary' attribute because it contains relevant data in the system (e.g., more relevant than other attributes' data); So, a weight of 2 is set for it; Each match in this particular attribute will improve the score twice as much as other matches in other attributes; For another example, this weighting can be used to increase the importance of all '*format*' attributes (i.e., attributes whose name contains 'format') or the importance of attributes with the value '*pdf*' (e.g., in the event that PDF formatted documents are important compared to other documents that match in other formats) by setting a weight of 4 for them;

Facc_and(x) is a function that takes a number of constraint as parameter (unlimited positive integer) and returns a real number value within [0,1];

Facc_and(x) provides an output value that increases with increasing values of x;

Facc_or(x) is a function that takes a number of constraint as parameter (unlimited positive integer) and returns a real number value within [0,1];

Facc_or(x) provides an output value that decreases with increasing values of x; and Score[accuracy/validity] output value is within [0,1].

In various embodiments, for the scope/depth score and/or accuracy/validity score, each time a query term is matched it is checked to see if it is a full-word, same-stem-word, or a sub-word match. In this way, the scope/depth score and/or accuracy/validity score can favour full-word matches that are obviously more relevant to the user. Other matches do not indicate as precisely whether the document being scored is relevant for the user. For example, a full-word match counts as a 1.0 match. A same-stem-word match counts as 0.7 match. A sub-word match counts as 0.3 match. So, if the query term to look for is 'test', then: The full-text "Test suite" will also get one full match; The full-text "document about testing" will get 0.7 match; And, the full-text "Attestation" will get 0.3 match.

In some embodiments, the validity/accuracy score is tuned for a particular user, super user, administrator, type of search, or any other appropriate tuning. For example, a search for products may set the constraint weight with different values as compared to a search for human resource record.

In 304, a clarity score is calculated. The clarity score is designed to capture the extent to which information is presented in a clear and well-organized manner. For the clarity score the presence of special attributes (e.g., title, abstract, or date) are counted even if their associated constraints are not satisfied. Also, the attributes are checked for readability. For example, the attributes are checked to see if they are not a file name, not a uniform record locator (URL), or that the proportion of special characters (e.g., '/', '.', 'Å', '<', '>', '?', '&', etc.) is not high, or any other appropriate measure for clarity.

In some embodiments, a clarity score uses the following:

Score[clarity]=$F$clar($nb$ClearAttributes);

Where

Fclar(x) is a function that takes a number of clear attributes as parameter and returns a real within [0,1]; Fclar(x) output value increases as x increases;

nbClearAttributes is the number of clear attributes (counting only the special attributes that are readable); and Score[clarity] output value is within [0,1].

In various embodiments, clarity function includes a tuning for specialized searches—for example, emphasis given to the presence or absence of mathematical, scientific, medical, computer code, legal terms, or any other appropriate specialized clarity terms. For example a search for code, for math or science or medical records may have a higher value for content that includes a high degree of math symbols, computer code, scientific, medical, or any other appropriate terminology. In some embodiments, an automated analysis is used to determine clarity.

In 306, a currency score is calculated. The currency score analyzes the date attribute and gives a better score to recent results than to old results. In some embodiments, recent and old can have different time frames dependent on the content; for example, stock news is considered recent with a different time scale as compared to housing prices.

In some embodiments, a currency score uses the following:

Score[currency]=$F$curr(date);

Where

Fcurr(x) is a function that takes a date as parameter and returns a real number value within [0,1]; For a recent date, the function returns a real number value near 1; For an old date, the function returns a real number value near 0. In some embodiments, the maximum age is capped—for example, dates older than five years are considered to be five years old, or, in the case of a faster changing information arena, dates older than four days are considered to be four days old; Fcurr(x) has output that decreases as a function of increasing x; and Score[currency] is within [0,1].

In some embodiments, currency score may be a peaked function (e.g., pyramid, Gaussian, or any other peaked function) with the peak corresponding to a date of interest and a width corresponding to an appropriate time scale width. For example, a search may be performed regarding a weather event where documents are given highest priority on the day of the weather event and lower priorities just prior and after, but dwindling down to no priority for documents more than a week before or a week after. In some embodiments, the peaked function can be asymmetric where there is no interest in content from before the date (e.g., only interested in the after-effects or analysis regarding an event or date) or after the date (e.g., only interested in content predictions or speculations prior to an event). In some embodiments, a tuning of the currency function for a specialized search allows the adjustment of the time weighting function including the peak, the width, and the shape of the function.

In 308, a quality of source score is calculated. The quality of source score provides a means to enhance sources based on an assessment of quality of the source. In some embodiments, a quality of source score uses the following:

Score[source]=$F_{src}$(resultRank[source])*RankConfidence[source];

Where $F_{src}(x)$ is a function that takes a result rank as parameter and returns a real number value within [0,1]; $F_{src}(x)$ output decreases with increasing x;

RankConfidence[source] is a weight for the source ranking confidence, a real number value within [0,1]; This value can be set by the administrator; and Score[source] output value is within [0,1].

In various embodiments, the quality or source score may emphasize a type of repository based on the type of search. For example, code searches may emphasize code repositories or web resources with code stored; news searches may emphasize news sources or repositories, financial searches may emphasize financial sites or repositories; medical searches may emphasize medical repositories or web resources. In some embodiments, the tuning of the quality of source score includes the specialized tuning for searches of legal, financial, medical, scientific, or any other appropriate source tunings.

In 310, a final relevancy score is calculated. In some embodiments, a final relevancy score uses the following:

W1=factor_scope_depth;

W2=factor_accuracy_validity;

W3=factor_clarity;

W4=factor_currency;

W5=factor_quality_of_sources*rank_confidence_in_a_specific_source;

Relevancy_score=(W1*Score[scope/depth]+

W2*Score[accuracy/validity]+

W3*Score[clarity]+

W4*Score[currency]+

W5*Score[sources])/

(W1+W2+W3+W4+W5)+

(source_bonus);

Where factor_scope_depth is a weighting factor for the scope/depth score used when combining the scope/depth score is combined into an intermediate score S; This weighting factor is set empirically so that the resultant relevancy score matches a users assessment of relevancy;

factor_accuracy_validity is a weighting factor for the accuracy/validity score used when combining the accuracy/validity score is combined into an intermediate score S; This weighting factor is set empirically so that the resultant relevancy score matches a users assessment of relevancy;

factor_clarity is a weighting factor for the clarity score used when combining the clarity score is combined into an intermediate score S; This weighting factor is set empirically so that the resultant relevancy score matches a users assessment of relevancy;

factor_currency is a weighting factor for the currency score used when combining the currency score is combined into an intermediate score S; This weighting factor is set empirically so that the resultant relevancy score matches a users assessment of relevancy;

factor_sources is a weighting factor for the quality of sources score used when combining the quality of sources score is combined into an intermediate score S; This weighting factor is set empirically so that the resultant relevancy score matches a users assessment of relevancy;

rank_confidence_in_a_specific_source is a user, super-user, or administrator settable weighting for source; For each source, the confidence in the source's ranking can be defined as a value within [0,1]. '0' indicates that the result rankings returned by the source are not taken into account at all. '1' indicates that the result rankings returned by the source are taken into account completely; Note that in some embodiments, this value can be set by an user, a super user, and/or administrator; and source_bonus is a user, super-user, or administrator settable weighting for a specific source; This bonus is added to the score of all results coming from a specific source (or a specific type of source), depending whether the query sent to the source contains a constraint on full-text or on attributes; For example, a source bonus of 0.3 is defined for all internal sources (e.g., source of type 'documentum docbase') if the query sent contains a constraint on attributes; Then, if the query is 'find documents which title contains "test"' then all results coming from internal sources will be given a bonus of 0.3; On the other hand, if the query is 'find documents which full-text contains "test"', then no bonus is applied; As another example, for all internal sources a 0.3 bonus is defined for queries with constraint on attribute, and another 0.2 bonus for queries with constraint on full-text; Then, if the query contains both constraints, the results returned by internal sources will be given a 0.3 bonus (i.e., the maximum of 0.3 and 0.2); Note that in some embodiments, this value can be set by an user, a super user, and/or administrator.

In some embodiments, the relevancy score is merged with an internal source (e.g., Documentum database score) or other source score using the formula:

Merged_score=(Relevancy_score+ Source_score*rating_weight_of_the_source)/(1+ rating_weight_of_the_source);

Where

Source_score is the score from the internal or other source; and

Rating weight of the source is the relative weight of the internal source; With this weight the score of some important sources can be favoured or, on the other hand, the score of some unreliable sources can be ignored.

In some embodiments, the merging occurs when calculating or determining a relevancy ranking (e.g., as in 206 of FIG. 2).

In some embodiments, there is a tuning of the relevancy score for a specific application, source, search, user, a super user, an administrator or any other appropriate tuning. Tuning may affect one or multiple parameters in the score or ranking. In some embodiments, the tuning may include adding or multiplying one or more constants or one or more functions to the score or ranking algorithm to have a desired effect. For example, a user may perform many searches for medical articles so that emphasis is given to current articles (e.g., within the past three years) from journals (e.g., from journal sites, medical article sources/repositories, reputable web sites, etc.) with good reputations that include a high degree of medical terminology (e.g., medical specialty terms in the title, abstract, and body). In another example, a person may search for events near and around a family member's birthday so that emphasis is given to content from that date from sources showing current events (e.g., news repositories, blogs, video sites, etc.) with common usage clarity (e.g., no computer code).

Figure 4:
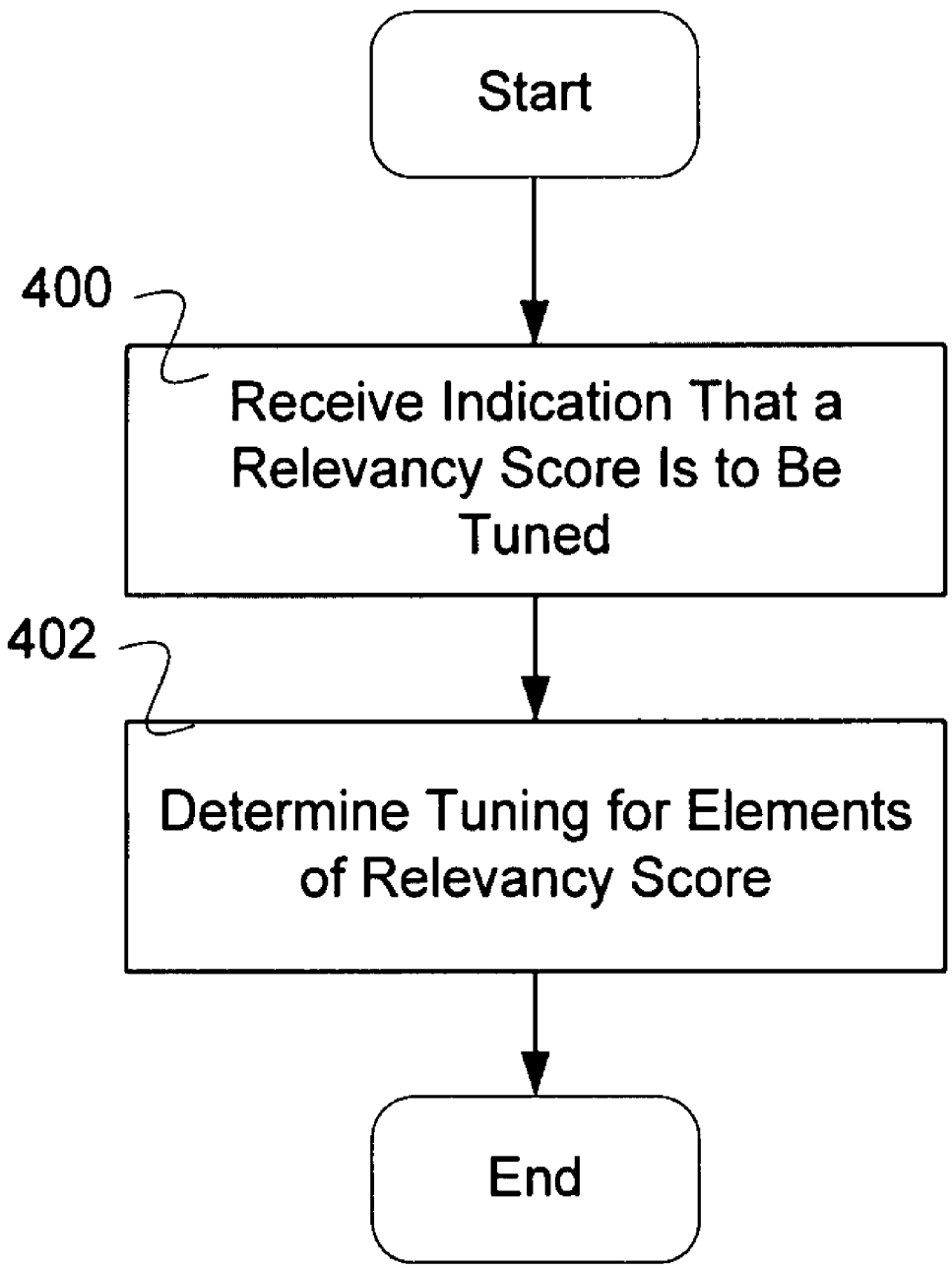
FIG. 4 is a flow diagram illustrating an embodiment of a process for tuning a relevancy score.

FIG. 4 is a flow diagram illustrating an embodiment of a process for tuning a relevancy score. In the example shown, in 400 an indication is received that a relevancy score is to be tuned. A user, a super user, an administrator, or any other searcher indicates a tuning by adjusting a weight/constant/ function shape for a set of user-friendly criteria. In various embodiments, the indication is using a graphical user interface, a configuration file, a script, or any other appropriate manner of indicating a tuning. In various embodiments, a weight or constant is adjusted using a button, radio dial, slider switch, a numerical value, or any other appropriate manner of adjusting a weight or constant. In various embodiments, a function shape is selected by indicating a button near a graphic of a function graph, a math formula, or a self drawn function shape, or any other appropriate manner of selecting a function shape. In 402, tuning of elements of the relevancy score is determined. Each part of the relevancy score includes a number of elements that are added or multiplied or have a functional form. Each element is adjusted appropriately based on the input easily adjusted user selection. For example, an indication of a computer code search would favor sources that are code repositories and search results with clarity score that was adjusted to include computer code vocabulary as well as symbols associated with computer coding. The computer code search would also favor more recent results to avoid compatibility issues with older operating systems/plug-ins/compilers/hardware environments etc.

Figure 5:
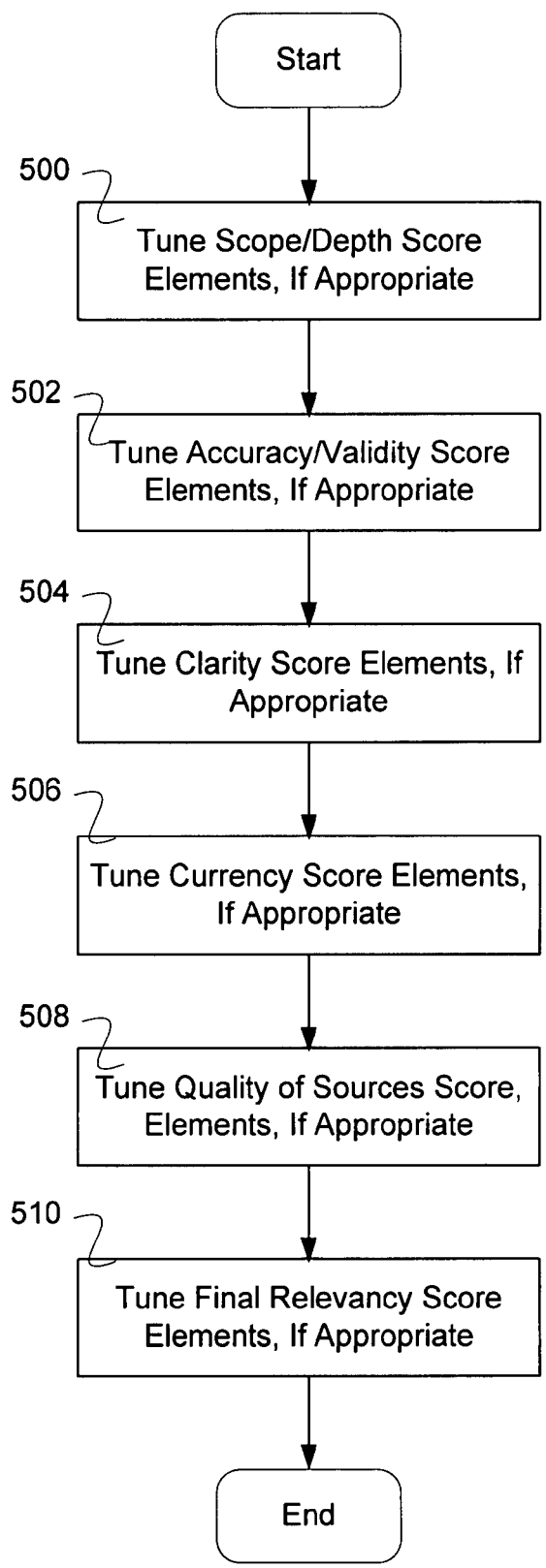
FIG. 5 is a flow diagram illustrating an embodiment of a process for tuning of elements of the relevancy score.

FIG. 5 is a flow diagram illustrating an embodiment of a process for tuning of elements of the relevancy score. In some embodiments, the process of FIG. 5 is used to implement the 402 of FIG. 4. In the example shown, in 500 scope/depth score elements are tuned, if appropriate. In 502, accuracy/ validity score elements are tuned, if appropriate. In 504, clarity score elements are tuned, if appropriate. In 506, currency score elements are tuned, if appropriate. In 508, quality of source score elements are tuned, if appropriate. In 510, final relevancy score elements are tuned, if appropriate.

For example, in terms of the relevancy score as calculated in 310 of FIG. 3 (and similarly for the other scores), W1, W2, W3, W4, W5 (including both factor_quality_of sources and rank_confidence_in_a_specific_source), and source_bonus may be tuned by adding or multiplying a factor or function. As another example, in terms of the currency score as calculated in 306 of FIG. 3 (and similarly for functions for the other scores), the function fcurr(date) can take on a different form being any specified shape with value sloping up or down, saturating, or peaking before, after, at, or near the date input as an input parameter.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of determining a relevancy ranking score, comprising:

receiving an indication that tuning a relevancy ranking score algorithm to a selected preference is desired, wherein the relevancy ranking score comprises a sum of three or more feature scores each multiplied by a separate weight, wherein the three or more feature scores comprise a scope or depth score, an accuracy or validity score, a clarity score, a currency score, or a source score, and wherein the scope or depth score comprises a score indicating satisfied constraints, and wherein the accuracy or validity score comprises a score indicating constraints improving query precision, and wherein the clarity score comprises a score indicating information presented in a clear manner, and wherein the currency score comprises a score indicating more recent results, and wherein the source score comprises a score indicating source quality, wherein presented in the clear manner for the clarity score comprises having a higher score in an event in which a title, an abstract, or a date is present; and updating, using a processor, the relevancy ranking score algorithm based at least in part on the selected preference, wherein the relevancy ranking score of a search result resulting from a search query is based at least in part on one or more constraints of the search query.

2. The method of claim 1, wherein the relevancy ranking score is used to determine a search result ranking for a plurality of search results resulting from the search query.

3. The method of claim 1, further comprising calculating the relevancy ranking score for the search result based on the updated relevancy score algorithm.

4. The method of claim 1, wherein the relevancy ranking score includes a conditional favoring of a search result with attribute B='Y' if attribute A='X'.

5. The method of claim 1, wherein the search result is one of a plurality of search results from a plurality of search sources.

6. The method of claim 1, wherein updating the relevancy ranking score algorithm includes adding a constant to an element of the relevancy ranking score algorithm.

7. The method of claim 1, wherein updating the relevancy ranking score algorithm includes a multiplying by a constant an element of the relevancy ranking score algorithm.

8. The method of claim 1, wherein updating the relevancy ranking score algorithm includes adding a function to an element of the relevancy ranking score algorithm.

9. The method of claim 1, wherein updating the relevancy ranking score algorithm includes a multiplying by a function an element of the relevancy ranking score algorithm.

10. A computer program product for determining a relevancy ranking score, the computer program product being embodied in a computer readable medium and comprising computer instructions for:
   receiving an indication of a selection that tuning the relevancy ranking score to a selected preference is desired, wherein the relevancy ranking score comprises a sum of three or more feature scores each multiplied by a separate weight, wherein the three or more feature scores comprise a scope or depth score, an accuracy or validity score, a clarity score, a currency score, or a source score, and wherein the scope or depth score comprises a score indicating satisfied constraints, and wherein the accuracy or validity score comprises a score indicating constraints improving query precision, and wherein the clarity score comprises a score indicating information presented in a clear manner, and wherein the currency score comprises a score indicating more recent results, and wherein the source score comprises a score indicating source quality, wherein presented in the clear manner for the clarity score comprises having a higher score in an event in which a title, an abstract, or a date is present; and
   updating a relevancy ranking score algorithm based at least in part on the indication of the selection of the selected preference, wherein the relevancy ranking score of a search result resulting from a search query is based at least in part on one or more constraints of the search query.

11. A system for determining a relevancy ranking score, comprising:
   a processor; and
   a memory coupled with the processor, wherein the memory is configured to provide the processor with instructions which when executed cause the processor to:
   receive an indication of a selection that tuning the relevancy ranking score to a selected preference is desired, wherein the relevancy ranking score comprises a sum of three or more feature scores each multiplied by a separate weight, wherein the three or more feature scores comprise a scope or depth score, an accuracy or validity score, a clarity score, a currency score, or a source score, and wherein the scope or depth score comprises a score indicating satisfied constraints, and wherein the accuracy or validity score comprises a score indicating constraints improving query precision, and wherein the clarity score comprises a score indicating information presented in a clear manner, and wherein the currency score comprises a score indicating more recent results, and wherein the source score comprises a score indicating source quality, wherein presented in the clear manner for the clarity score comprises having a higher score in an event in which a title, an abstract, or a date is present; and
   update a relevancy ranking score algorithm based at least in part on the indication of the selection of the selected preference, wherein the relevancy ranking score of a search result resulting from a search query is based at least in part on one or more constraints of the search query.

12. A method of determining a relevancy ranking score, comprising:
   receiving an indication of a selection that tuning a relevancy ranking score algorithm to a selected preference is desired; and
   updating, using a processor, a relevancy score calculation based at least in part on the indication of the selection of the selected preference, wherein the relevancy score of a search result resulting from a search query is based at least in part on a currency score of the search result, and wherein the relevancy ranking score comprises a sum of two or more feature scores each multiplied by a separate weight, wherein the two or more feature scores comprise a scope or depth score, an accuracy or validity score, a clarity score, or a source score, and wherein the scope or depth score comprises a score indicating satisfied constraints, and wherein the accuracy or validity score comprises a score indicating constraints improving query precision, and wherein the clarity score comprises a score indicating information presented in a clear manner, and wherein the currency score comprises a score indicating more recent results, and wherein the source score comprises a score indicating source quality, wherein presented in the clear manner for the clarity score comprises having a higher score in an event in which a title, an abstract, or a date is present.

13. A computer program product for determining a relevancy ranking score, the computer program product being embodied in a computer readable medium and comprising computer instructions for:
   receiving an indication of a selection that tuning a relevancy ranking score algorithm to a selected preference is desired; and
   updating a relevancy score calculation based at least in part on the indication of the selection of the selected preference, wherein the relevancy score of a search result resulting from a search query is based at least in part on a currency score of the search result, and wherein the relevancy ranking score comprises a sum of two or more feature scores each multiplied by a separate weight, wherein the two or more feature scores comprise a scope or depth score, an accuracy or validity score, a clarity score, or a source score, and wherein the scope or depth score comprises a score indicating satisfied constraints, and wherein the accuracy or validity score comprises a score indicating constraints improving query precision, and wherein the clarity score comprises a score indicating information presented in a clear manner, and wherein the currency score comprises a score indicating more recent results, and wherein the source score comprises a score indicating source quality, wherein presented in the clear manner for the clarity score comprises having a higher score in an event in which a title, an abstract, or a date is present.

14. A system for determining a relevancy ranking score, comprising:
   a processor; and
   a memory coupled with the processor, wherein the memory is configured to provide the processor with instructions which when executed cause the processor to:
   receive an indication of a selection that tuning a relevancy ranking score algorithm to a selected preference is desired; and
   update a relevancy score calculation based at least in part on the indication of the selection of the selected preference, wherein the relevancy score of a search result resulting from a search query is based at least in part on a currency score of the search result, wherein the relevancy ranking score comprises a sum of two or more feature scores each multiplied by a separate weight, wherein the two or more feature scores comprise a scope or depth score, an accuracy or validity score, a clarity score, or a source score, and wherein the scope or depth score comprises a score indicating satisfied constraints, and wherein the accuracy or validity score comprises a score indicating constraints improving query precision, and wherein the clarity score comprises a score indicating information presented in a clear manner, and wherein the currency score comprises a score indicating more recent results, and wherein the source score comprises a score indicating source quality, wherein presented in the clear manner for the clarity score comprises having a higher score in an event in which a title, an abstract, or a date is present.

15. A method of determining a relevancy ranking score, comprising:
receiving an indication of a selection that tuning a relevancy ranking score algorithm to a selected preference is desired; and
updating, using a processor, a relevancy score calculation based at least in part on the indication of the selection of the selected preference, wherein the relevancy score of a search result resulting from a search query is based at least in part on a clarity score of the search result, wherein the relevancy ranking score comprises a sum of two or more feature scores each multiplied by a separate weight, wherein the two or more feature scores comprise a scope or depth score, an accuracy or validity score, a currency score, or a source score, and wherein the scope or depth score comprises a score indicating satisfied constraints, and wherein the accuracy or validity score comprises a score indicating constraints improving query precision, and wherein the clarity score comprises a score indicating information presented in a clear manner, and wherein the currency score comprises a score indicating more recent results, and wherein the source score comprises a score indicating source quality, wherein presented in the clear manner for the clarity score comprises having a higher score in an event in which a title, an abstract, or a date is present.

16. A computer program product for determining a relevancy ranking score, the computer program product being embodied in a computer readable medium and comprising computer instructions for:
receiving an indication of a selection that tuning a relevancy ranking score algorithm to a selected preference is desired; and
updating a relevancy score calculation based at least in part on the indication of the selection of the selected preference, wherein the relevancy score of a search result resulting from a search query is based at least in part on a clarity score of the search result, and wherein the relevancy ranking score comprises a sum of two or more feature scores each multiplied by a separate weight, wherein the two or more feature scores comprise a scope or depth score, an accuracy or validity score, a currency score, or a source score, and wherein the scope or depth score comprises a score indicating satisfied constraints, and wherein the accuracy or validity score comprises a score indicating constraints improving query precision, and wherein the clarity score comprises a score indicating information presented in a clear manner, and wherein the currency score comprises a score indicating more recent results, and wherein the source score comprises a score indicating source quality, wherein presented in the clear manner for the clarity score comprises having a higher score in an event in which a title, an abstract, or a date is present.

17. A system for determining a relevancy ranking score, comprising:
a processor; and
a memory coupled with the processor, wherein the memory is configured to provide the processor with instructions which when executed cause the processor to:
receive an indication of a selection that tuning a relevancy ranking score algorithm to a selected preference is desired; and
update a relevancy score calculation based at least in part on the indication of the selection of the selected preference, wherein the relevancy score of a search result resulting from a search query is based at least in part on a clarity score of the search result, and wherein the relevancy ranking score comprises a sum of two or more feature scores each multiplied by a separate weight, wherein the two or more feature scores comprise a scope or depth score, an accuracy or validity score, a currency score, or a source score, and wherein the scope or depth score comprises a score indicating satisfied constraints, and wherein the accuracy or validity score comprises a score indicating constraints improving query precision, and wherein the clarity score comprises a score indicating information presented in a clear manner, and wherein the currency score comprises a score indicating more recent results, and wherein the source score comprises a score indicating source quality, wherein presented in the clear manner for the clarity score comprises having a higher score in an event in which a title, an abstract, or a date is present.

18. A method of determining a relevancy ranking score, comprising:
receiving an indication of a selection that tuning a relevancy ranking score algorithm to a selected preference is desired; and
updating, using a processor, a relevancy score calculation based at least in part on the indication of the selection of the selected preference, wherein the relevancy score of a search result resulting from a search query is based at least in part on one or more attributes that are synthesized from one or more search results responsive to the search query, and wherein the relevancy ranking score comprises a sum of two or more feature scores each multiplied by a separate weight, wherein the two or more feature scores comprise a scope or depth score, an accuracy or validity score, a clarity score, a currency score, or a source score, and wherein the scope or depth score comprises a score indicating satisfied constraints, and wherein the accuracy or validity score comprises a score indicating constraints improving query precision, and wherein the clarity score comprises a score indicating information presented in a clear manner, and wherein the currency score comprises a score indicating more recent results, and wherein the source score comprises a score indicating source quality, wherein presented in the clear manner for the clarity score comprises having a higher score in an event in which a title, an abstract, or a date is present.

19. A computer program product for determining a relevancy ranking score, the computer program product being embodied in a computer readable medium and comprising computer instructions for:
receiving an indication of a selection that tuning a relevancy ranking score algorithm to a selected preference is desired; and
updating a relevancy score calculation based at least in part on the indication of the selection of the selected preference, wherein the relevancy score of a search result resulting from a search query is based at least in part on one or more attributes that are synthesized from one or more search results responsive to the search query, and wherein the relevancy ranking score comprises a sum of two or more feature scores each multiplied by a separate weight, wherein the two or more feature scores comprise a scope or depth score, an accuracy or validity score, a clarity score, a currency score, or a source score, and wherein the scope or depth score comprises a score indicating satisfied constraints, and wherein the accuracy or validity score comprises a score indicating constraints improving query precision, and wherein the clarity score comprises a score indicating information presented in a clear manner, and wherein the currency score comprises a score indicating more recent results, and wherein the source score comprises a score indicating source quality, wherein presented in the clear manner for the clarity score comprises having a higher score in an event in which a title, an abstract, or a date is present.

20. A system for determining a relevancy ranking score, comprising:

a processor; and a memory coupled with the processor, wherein the memory is configured to provide the processor with instructions which when executed cause the processor to:

receive an indication of a selection that tuning a relevancy ranking score algorithm to a selected preference is desired; and update a relevancy score calculation based at least in part on the indication of the selection of the selected preference, wherein the relevancy score of a search result resulting from a search query is based at least in part on one or more attributes that are synthesized from one or more search results responsive to the search query, and wherein the relevancy ranking score comprises a sum of two or more feature scores each multiplied by a separate weight, wherein the two or more feature scores comprise a scope or depth score, an accuracy or validity score, a clarity score, a currency score, or a source score, and wherein the scope or depth score comprises a score indicating satisfied constraints, and wherein the accuracy or validity score comprises a score indicating constraints improving query precision, and wherein the clarity score comprises a score indicating information presented in a clear manner, and wherein the currency score comprises a score indicating more recent results, and wherein the source comprises a score indicating source quality, wherein presented in the clear manner for the clarity score comprises having a higher score in an event in which a title, an abstract, or a date is present.

* * * * *